United States Patent [19]
Ueno et al.

[11] Patent Number: 5,991,811
[45] Date of Patent: Nov. 23, 1999

[54] INFORMATION TRANSMISSION SYSTEM UTILIZING BOTH REAL-TIME DATA TRANSMITTED IN A NORMAL-IN-TIME DIRECTION AND IN A RETROSPECTIVE-IN-TIME DIRECTION

[75] Inventors: Hideyuki Ueno, Tokyo-to; Yoshiharu Uetani, Kawasaki; Tadahiro Oku, Kawasaki; Mitsunori Omokawa, Kawasaki; Yukio Kamatani; Tsuguhiro Hirose, both of Yokohama; Yoshimitsu Shimojo, Kawasaki, all of Japan

[73] Assignee: Kabushiki Kaisha Toshiba, Kawasaki, Japan

[21] Appl. No.: 08/707,394

[22] Filed: Sep. 4, 1996

[30] Foreign Application Priority Data

Sep. 4, 1995 [JP] Japan ................................. 7-225638

[51] Int. Cl.$^6$ .................................................. G06F 13/00
[52] U.S. Cl. .......................................... 709/231; 709/219
[58] Field of Search ........................... 395/200.6, 200.61, 395/200.62, 200.64, 200.47, 200.49, 200.3, 200.31; 709/200–201, 217, 219, 230–232, 234

[56] References Cited

U.S. PATENT DOCUMENTS

| | | | |
|---|---|---|---|
| 5,421,031 | 5/1995 | De Bey | 455/5.1 |
| 5,577,258 | 11/1996 | Cruz et al. | 395/200.49 |
| 5,606,359 | 2/1997 | Youden et al. | 348/7 |
| 5,610,841 | 3/1997 | Tanaka et al. | 395/200.49 |
| 5,671,377 | 9/1997 | Bleidt et al. | 345/328 |
| 5,701,582 | 12/1997 | DeBey | 345/328 |
| 5,748,389 | 5/1998 | Caldara et al. | 370/389 |
| 5,751,883 | 5/1998 | Ottesen et al. | 386/27 |
| 5,758,085 | 5/1998 | Kouoheris et al. | 395/200.61 |

FOREIGN PATENT DOCUMENTS 5-501942  4/1993  Japan .

OTHER PUBLICATIONS

Mano, M., Digital Design, 2nd ed., Simon & Schuster, pp. 452–455, 1991.

Primary Examiner—Zarni Maung
Assistant Examiner—Andrew Caldwell
Attorney, Agent, or Firm—Foley & Lardner

[57] ABSTRACT

An information transmit system includes a first communication element having a guaranteed quality required to transmit real-time information, and a second communication element different from the first communication element. The system also includes a transmission element for transmitting stored real-time information using the first communication element and for transmitting real-time data using the second communication element, where the real-time data using the second communication element has corresponding time stamps later in time than the real-time data transmitted by the first communication element. For example, a time stamp of the real-time data may be used to transmit the data in either a normal direction (using the first communication element), or in a retrospective direction (using the second communication element). The system also includes a storage element for storing the real-time data transmitted by at least the second communication element, and a switching element for monitoring a time stamp corresponding to the real-time data transmitted from the first communication element and a time stamp corresponding to the real-time data transmitted from the second communication element. The switching unit switches the output of the real-time information transmitted from the first communication element, to the output of the real-time data transmitted from the second communication element that is stored in the storage element, when the time stamp for reproducing the real-time data stored in the storage element has been reached.

10 Claims, 11 Drawing Sheets

INFORMATION TRANSMISSION SYSTEM UTILIZING BOTH REAL-TIME DATA TRANSMITTED IN A NORMAL-IN-TIME DIRECTION AND IN A RETROSPECTIVE-IN-TIME DIRECTION

BACKGROUND OF THE INVENTION

The present invention relates to a system for realizing a service to reproduce a stored media via a network in real time, such as a VOD (video on demand) service. More specifically, the invention relates to a system for properly using various service classes of a network for each service suitable for its characteristic.

The present invention also relates to a system for realizing a service to offer a media information stored in a server, to a user via a network in real time on his/her demand. In particular, the present invention is directed to a system for data such as managed in time series. Specifically, the invention is directed to a system for data having characteristic wherein the use of the data is managed by a time information such as a time stamp. Throughout this specification, these data will be referred to as real-time data.

In recent years, interactive video services have begun to be made fit for practical use due to the developments of high-speed, wide-band networks and digital image techniques. One of typical examples of such services is a VOD service. The VOD service is a service in which a video server for storing a video source therein is connected to a client basically in the form of one-to-one so that the video source is outputted from the video server generally on the client's demand for reproduction, search, special reproduction or the like. It is assumed that most of the VOD services utilize an ATM (asynchronous transfer mode) for at least the key of a network. Furthermore, throughout this specification, video servers include a temporary memory type server, called a cache node or a network cache, in which a video is stored on or near a communication line set for transmitting the video information which is being offered to a user, and the same video is reused on another user's demand.

In the ATM, a number of classes are provided. For example, in the ATM forum serving as an organization for establishing the trade standard of ATM, the following five classes are standardized. That is, there are CBR (Constant Bit Rate), RT-VBR (Real Time Variable Bit Rate), NRT-VBR (Non-Real Time Variable Bit Rate), ABR (Available Bit Rate) and UBR (Unspecified Bit Rate). Among these classes, the service class of CBR is generally used in the present circumstances since the video transmitting service as set forth above is a real time service.

Then, there will be considered the five service classes as set forth above. From the standpoint of a real-time characteristic, the qualities of two classes including the CBR and the RT-VBR, which are guarantee classes, are guaranteed. In addition, although the CBR has an extremely low probability of discarded cells and a high quality, the cost thereof is high since it does not use the statistical multiplexing effect which is considered to be particularly effective as a method for effectively utilizing bands in the ATM. The RT-VBR is cheaper than the CBR since it uses the statistical multiplexing effect, although the cell discarding characteristic thereof is not better than the CBR. On the other hand, although the real-time characteristics of the NRT-VBR, the ABR and the UBR are not guaranteed, it can be expected that the communication cost is greatly decreased because these services are the best effort services for effectively using space bands.

In the conventional image transmitting systems as set forth above, the transmitting quality is constant in the CBR. For example, consider the situation wherein a two-hour video is watched via the VOD. In general, as the required qualities for the communication call in the VOD, the following matters are guessed: a real-time characteristic for immediate offer, a low rate of discarded cells for ensuring the qualities of image and voice, and a low-cost communication for realizing to decrease the cost of a video service. From the points of the guarantees of the real time characteristic and the cell discarding characteristic, the CBR is selected as a premise.

In general, in the case of the CBR, a band is assigned at a peak cell rate in a call connecting procedure, and this band remains being constantly set while the call is set. The CBR has a good quality since communication is performed after sufficiently ensuring the band. However, since this system does not use the multiplexing effect, the communication cost is high. For example, consider the VOD as set forth above. It is required to set the call while the video is watched. Considering that an image is transmitted to a communication line of 155 Mbps by a MPEG system of 6 Mbps, an image of 25 lines can be simultaneously delivered. On this condition, the communication cost is set. Of course, since the cost for software is also required, it is important to reduce the communication cost. In the conventional systems, there is a problem of decreasing the cost.

In addition, in the conventional system, the video, which has been stored for the previous client, is reused when another client accesses thereto. However, since the storage capacity of the data storage unit is limited, it is required to successively erase videos having a low frequency in access. In this case, the erasing of videos must be performed for each video source. Therefore, in a case where another client accesses immediately after the video source is erased, it is required to perform the transmission via the CBR again, the aforementioned problems become worse.

Since video sources to be offered in VOD services do not include only movies put on the screens in movie theaters, but also include many categories of video sources such as TV movies, dramas and documentary films, and also include all the products which have been produced up to now since a movie has been made, the number thereof is extremely vast. On the other hand, since the memory capacity of a video server for storing such video sources is limited, it is impossible to store all the video sources in a single video server. Also, the quantity of information which is able to be read out of a single video server at the same time is limited. Therefore, in general, it has been considered to adopt a two-hierarchy configuration wherein video servers for storing video sources, which are expected that the frequency in access is high, are arranged at locations near the users every local area, and video servers for storing video sources, which are expected that the frequency in access is low, are arranged at a center remote from the users, or a multi-hierarchy configuration in accordance with the frequency in access.

Thus, in a case where video servers for storing video sources to be offered are dispersively arranged on a network, it is required to establish a communication line between a user and a video server nearest the user among video servers, which have stored video sources on the user's demand, to transmit a video through the established communication line from the standpoint of communication cost. Conventional systems are designed that a user determines a video by a previously distributed video list or the like to directly designate the video. Therefore, after the user designates the video, it is enough to determine the optimum video server for the offer of the video to establish the communication line.

However, it is considered in the future that it will be possible for a user to establish a communication line between the user and the most terminal video server to finally determine a video, that the user wishes to view, while the user interactively accesses a video list displayed on a screen, a part of video sources prepared for preview, and a promotion video consisting of highlight scenes. In such a case, from the standpoints of the responsibility to the user and the communication cost, it is desired to store video lists or video information for preview in the terminal video servers. In this case, if the user actually attempts to establish a communication between the user and a video server having stored a video source, which contains a video that the user wishes to view, after the user determines the video, it is possible to establish the communication line when the communication network is crowded, so that it is not possible to offer the video to the user. In addition, when the number of services offered at the same time by the server for storing the video source reaches the performance limit of the server, it is possible to offer the video even if it is possible to establish a communication line. Thus, if a user attempts to ensure communication network resources and server resources after determining a video that the user wishes to view, the user may waste time for determining the video that the user wishes to view, so that it is extremely inconvenient for the user.

As mentioned above, although it is required to realize a service of a low call-discarding rate in order to realize the immediate offer of image in the conventional image transmitting system, there are problems of decreasing the costs of image transmitting services and of effectively utilizing communication resources.

SUMMARY OF THE INVENTION

It is therefore an object of the present invention to provide an information relay system and an information transmission system which can improve the efficiency of communication and which can decrease service costs.

In order to accomplish the aforementioned object, according to first aspect of the present invention, there is provided an information transmission system which comprises: first communication means having a guaranteed quality required to transmit a real-time information; second communication means different from the first communication means; means for transmitting a stored real-time information using the first communication means and for transmitting a real-time data using the second communication means, the real-time data being earlier than the real-time information transmitted by the first communication means; storage means for storing the information transmitted by at least the second communication means; and switching means for monitoring a period of time for reproducing the real-time information transmitted from the first communication means and a period of time for reproducing the real-time information stored in the storage means, and for switching the output of the real-time information transmitted from the first communication means, to the output of the real-time information transmitted from the storage means when the period of time for reproducing the real-time information stored in the storage means and transmitted from the second communication means elapses, so that the second communication means has a service class which does not always have a guaranteed quality required to transmit a real-time data, so as to realize an effective communication and to reduce the cost.

According to second aspect of the present invention, there is provided a real-time data transmitting system which comprises: first communication means having a guaranteed quality required to transmit a real-time data; second communication means different from the first communication means; transmitting means for transmitting a stored real-time data using the first communication means and for transmitting, using the second communication means, a real-time data which is earlier than the real-time data transmitted by the first communication means; storage means for storing the data transmitted by at least the second communication means; switching means for monitoring a reproducing time at which the real-time data transmitted from the first communication means is reproduced and a reproducing time at which the real-time data stored in the storage means is reproduced, and for switching the output of the real-time data transmitted from the first communication means, to the output of the real-time data transmitted from the storage means at the reproducing time at which the real-time data stored in the storage means and transmitted from the second communication means is to be reproduced; and reproduction means for receiving the output from the switching means to reproduce the real-time data, in order to realize an effective communication and to reduce the cost.

According to third aspect of the present invention, there is provided an information offer system which comprises: a plurality of data storage means, each storing a real-time data, the order of which is managed in time series; communication means for transmitting the real-time data; reproduction means for receiving and reproducing the real-time data; communication-network-resources management control means for managing communication resources of the communication means and for establishing a communication line between the data storage means and the reproduction means; storage-resources management control means for managing the kind of the real-time data stored in the data storage means, and for managing the number of real-time data being able to be transmitted by the data storage means at the same time, to determine one of the plurality of data storage means, by which a required real-time data is to be transmitted; and service control means for accepting a demand for services from a user, and for directing the communication-network-resources management control means and the storage-resources management control means to reserve resources on the basis of the state of resources obtained by the communication-network-resources management control means and the storage-resources management control means, the control means informing the user of only a real-time data, which is able to be offered immediately if selected, as a real-time data to be selected. In this system, the user is previously informed of real-time data which can be guaranteed to be offered immediately, so that the user can be select a real-time data among the informed real-time data. Therefore, it is possible to prevent the user from wasting time and labor for interactively selecting a required real-time data, so that it is possible to improve the facility for the user.

According to fourth aspect of the present invention, there is provided an information offer system which comprises: a plurality of data storage means, each storing a real-time data, the order of which is managed in time series; communication means for transmitting the real-time data; reproduction means for receiving and reproducing the real-time data; communication-network-resources management control means for managing communication resources of the communication means and for establishing a communication line between the data storage means and the reproduction means; storage-resources management control means for managing the kind of the real-time data stored in the data storage means, and for managing the number of real-time data being able to be transmitted by the data storage means at the same time, to determine one of the plurality of data storage means, by which a required real-time data is to be transmitted; and service control means for accepting a demand for services from a user, and for directing the communication-network-resources management control means and the storage-resources management control means to reserve resources on the basis of the state of resources obtained by the communication-network-resources management control means and the storage-resources management control means, the control means informing the user of a real-time data, which is able to be offered immediately if selected, as a real-time data to be selected, and the control means also informing the user of a real-time data wherein the reservation for resources sufficient to be offered immediately if selected, as a proposed real-time data which is not guaranteed to be offered immediately. In this system, the user is previously informed whether each real-time data is guaranteed to be offered immediately, so as to entrust the user with the determination whether the user runs the risk of wasting time and labor spent for interactively selecting a required real-time data, so that it is possible to improve the facility for the user.

According to fifth aspect of the present invention, there is provided a real-time data transmission system which comprises: first communication means having a guaranteed quality required to transmit a real-time data; second communication means different from the first communication means; means for transmitting a stored real-time data using the first communication means and for transmitting a real-time data using the second communication means, the real-time data being earlier than the real-time data transmitted by the first communication means; storage means for storing the data transmitted by at least the second communication means; and switching means for monitoring a period of time for reproducing the real-time data transmitted from the first communication means and a period of time for reproducing the real-time data stored in the storage means, and for switching the output of the real-time data transmitted from the first communication means, to the output of the real-time data transmitted from the storage means when the period of time for reproducing the real-time data stored in the storage means and transmitted from the second communication means elapses. According to this system, the second communication means uses a service class wherein the quality required to transmit a real-time data is not always guaranteed, so that it is possible to realize an effective communication to reduce the cost.

The aforementioned method is effective as a method for decreasing communication costs particularly when the service of storage type data such as VOD is offered in real time. A server system, which has received a demand for the offer of image, begins the offer of information to a receiving apparatus, which has transmitted the demand, in real time in the forward direction from the beginning of an information source such as a movie. As the quality in this case, the real-time characteristic and the low cell-discarding characteristic are required. Therefore, a class of a sufficiently guaranteed quality, such as the CBR, is used. On the other hand, at the same time as the offer of call, an information, which is not required to be offered in real time, is transmitted to the same receiving apparatus, for example, in the retrospective direction from the end of the information source, using a best effort communication class, such as the ABR and the UBR, as a second communication line, which is inexpensive although it is in non real time. The receiving apparatus transfers the real-time information transferred through the CBR, to the downward thereof as it is. On the other hand, the non-real-time information transferred through the best effort is being stored in a storage device, and the call for the high-quality class for real-time is released at the point of time when the non-real-time information reaches the same information as the real-time information. The information after that point of time is not required to be transferred through the CBR since it has been already stored in the storage device.

That is, if it is assumed that one information source is transferred, the portion of information transferred through the second-class communication line is unnecessary as the period of time for requesting to ensure the call of a high-quality class, and the transfer can be carried out at a low communication cost by that portion.

In particular, if the second communication line is the best effort class, the transfer can be extremely effectively carried out. That is, in the 6 Mbps MPEG information communication as set forth above, the transfer in the real-time information communication line must be carried out at a rate of 6 Mbps regardless of the band of the transmission line. However, in the best effort class used for the non-real-time information, the space bands except for the guarantee class are used with no useless to transfer the information. Therefore, if another user does not demand the offer of information, the best effort class can be used for the portion of 149 Mbps (155 Mbps–6 Mbps=149 Mbps). Therefore, it can be transferred using bands 20 times or more as large as those for the real-time information, so that it is the same that most of information is transferred via the best effort class. Of course, when another user demands the offer of information at the same time, such an efficiency can not be achieved. In general, in communication line designs, a band design is performed presupposing the asynchronism of calls such as a large crowd forming effect. Therefore, it is designed so as to have spare bands on the basis of a certain standard. From the standpoint of a band used efficiency, it can be expected that there are actually a great number of space bands for use in the ATM. For example, if the network is designed so that the band used efficiency is 50% at the cell level, the residual 50% can be used in the best effort class. As compared with the cost for transferring information via the CBR, the half thereof can be cheaply transferred at a cost of the best effort class.

In addition, such a multiplex transmission system, which uses a plurality of classes of different quality, is effective particularly in a core network using a large-capacity transmission line which has substantially the same capacity as that of a server system in which user's demands are multiplexed, so that it seems that the multiplex transmission system is not always required for transmission lines of an access network to respective homes. In such a case, if a system for receiving the plurality of classes to store a non-real-time information is provided as an intermediate system such as a headend arranged between the core network and the access network, it is possible to provide a system in which the cost performance of the whole network is good.

Moreover, the aforementioned real-time data storing means divides the real-time data into a plurality of data segments to be managed, and determines the erasing order of the respective data segments on the basis of an elapsed period of time from the final access time of the stored real-time data and of a required reproduction period of time from the head of the real-time data to the end of the respective data segments when it is considered that the stored capacity is saturated. Therefore, if it is required to erase a video source having a low frequency in access when the storage capacity of the real-time storing means is saturated, each video is not successively erased, but the video is erased from the portion remote from the head of the video source, which is suitable for the transmission via the best effort class, so that it is possible to decrease the probability that the transmission via the CBR is required when it is accessed again.

As mentioned above, according to the present invention, a best effort service class, which is not so suitable for the transfer of a real-time data, can be effectively used for the transfer of the real-time data, and it is possible to improve the efficiency of communication and to decrease the cost for the offer of a service.

As mentioned above, according to the present invention, it is possible to prevent the user from wasting time and labor for interactively selecting a required real-time data, by informing the user of only real-time data, which are able to be guaranteed to be offered immediately, or by informing the user whether the respective real-time data are guaranteed to be offered immediately, so that it is possible to improve the facility for the user. Alternatively, the determination whether the user runs the risk is entrusted to the user, so that it is possible to improve the facility for the user.

DESCRIPTION OF THE PREFERRED EMBODIMENT

Figure 1:
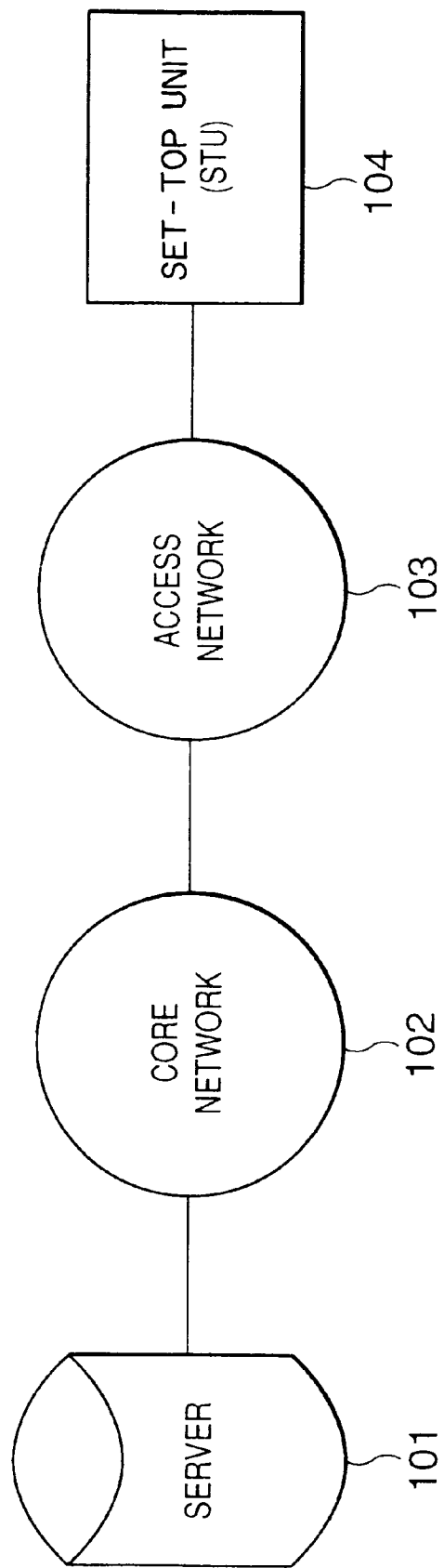
FIG. 1 is a schematic view illustrating the construction of a typical VOD system.

The present invention is effectively used in a method for decreasing communication costs particularly when the service of storage type data such as VOD is offered in real time. A server system, which has received a demand for the offer of image, begins the offer of information to a receiving apparatus, which has transmitted the demand, in real time in the forward direction from the beginning of an information source such as a movie. As the quality in this case, the real-time characteristic and the low cell-discarding characteristic are required. Therefore, a class of a sufficiently guaranteed quality, such as the CBR, is used. On the other hand, at the same time as the offer of call, an information, which is not required to be offered in real time, is transmitted to the same receiving apparatus, for example, in the retrospective direction from the end of the information source, using a best effort communication class, such as the ABR and the UBR, as a second communication line, which is inexpensive although it is in non real time.

The receiving apparatus transfers the real-time information transferred through the CBR, to the downward thereof as it is. On the other hand, the non-real-time information transferred through the best effort is being stored in a storage device, and the call for the high-quality class for real-time is released at the point of time when the non-real-time information reaches the same information as the real-time information. The information after that point of time is not required to be transferred through the CBR since it has been already stored in the storage device.

That is, if it is assumed that one information source is transferred, the portion of information transferred through the second-class communication line is unnecessary as the period of time for requesting to ensure the call of a high-quality class, and the transfer can be carried out at a low communication cost by that portion. In particular, if the second communication line is the best effort class, the transfer can be extremely effectively carried out.

That is, in the 6 Mbps MPEG information communication as set forth above, the transfer in the real-time information communication line must be carried out at a rate of 6 Mbps regardless of the band of the transmission line. However, in the best effort class used for the non-real-time information, the space bands except for the guarantee class are used with no waste to transfer the information. Therefore, if another user does not demand the offer of information, the best effort class can be used for the portion of 149 Mbps (155 Mbps–6 Mbps=149 Mbps).

Therefore, it can be transferred using bands 20 times or more as large as those for the real-time information, so that it is the same that most of information is transferred via the best effort class. Of course, when another user demands the offer of information at the same time, such an efficiency can not be achieved. In general, in communication line designs, a band design is performed presupposing the asynchronism of calls such as a large crowd forming effect. Therefore, it is designed so as to have spare bands on the basis of a certain standard. From the standpoint of a band used efficiency, it can be expected that there are actually a great number of space bands for use in the ATM. For example, if the network is designed so that the band used efficiency is 50% at the cell level, the residual 50% can be used in the best effort class. As compared with the cost for transferring information via the CBR, the half thereof can be cheaply transferred at a cost of the best effort class.

Such a multiplex transmission system, which uses a plurality of classes of different quality, is effective particularly in a core network using a large-capacity transmission line which has substantially the same capacity as that of a server system in which user's demands are multiplexed, so that it seems that the multiplex transmission system is not always required for transmission lines of an access network to respective homes. In such a case, if a system for receiving the plurality of classes to store a non-real-time information is provided as an intermediate system such as a headend arranged between the core network and the access network, it is possible to provide a system in which the cost performance of the whole network is good.

Referring now to the drawings, the preferred embodiment of the present invention will be described below. Furthermore, while all the following descriptions are directed to an image data transfer, the data of the present invention should be not always limited to a moving picture data as long as it is a real-time data (for example, audio data).

The present invention is directed to a system for data such as managed in time series. Specifically, the invention is directed to a system for data having characteristic wherein the use of the data is managed by a time information such as a time stamp. Throughout this specification, these data will be referred to as real-time data.

Furthermore, in general, the time management of the transmission of real-time data is often performed by applying time stamps thereto in a multiplex transmission format represented by the MPEG system standard. It is assumed that the present invention is also directed to such a case.

FIG. 1 is a schematic view illustrating the construction of a typical VOD system. This system generally comprises a server 101, networks 102 and 103, and a set-top unit (STU: a receiving terminal) 104. The network is further divided into a core network and an access network.

Figure 2:
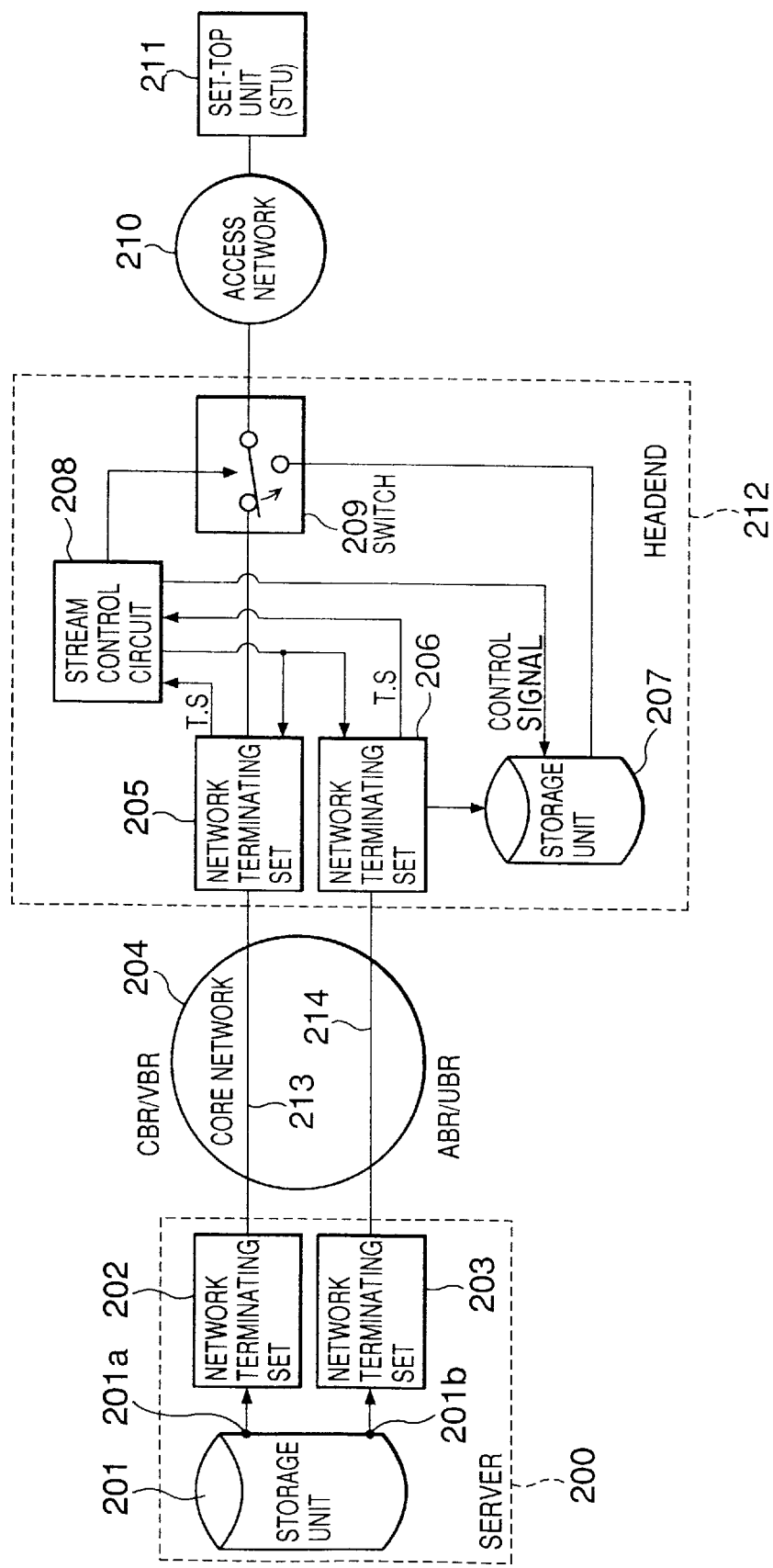
FIG. 2 is a schematic view of a first preferred embodiment of an information transmission system according to the present invention.

FIG. 2 is a schematic view of the first preferred embodiment of a moving-picture transmission system according to the present invention. In this figure, it is assumed that, for example, facilities called headend in a CATV system are arranged between the core network and the access network. In this case, the headend is connected to the STU via the access network (CATV network).

In FIG. 2, the reference number 201 denotes a storage unit for storing a video source therein. The storage unit 201 has a port 201a for outputting the video source in order from the beginning thereof, and a port 201b for outputting the video source in order from the end thereof. The reference numbers 202 and 203 denote network terminating sets which are connected to the corresponding ports 201a and 201b respectively. The network terminating set 202 performs communication using a service of a guaranteed communication quality such as the CBR and the VBR. The network terminating set 203 performs communication using a service class which does not always have a guaranteed communication quality such as the ABR and the UBR. These network terminating sets are connected to a headend 212 via a core network 204. The reference numbers 205 and 206 denote network terminating sets of the headend 212 on the side of the core network.

The storage unit 201 is a storage unit which can logically provide at least two ports for a client and which can access a single real-time data stream from two points or more at the same time (although FIG. 2 illustrates two sets of the ports, the network terminating sets and the lines, this merely illustrates the two sets logically, but there is often one set thereof physically. Access from two points or more at different time is the specification which is generally supported in a server system being capable of supporting multiple clients, and most cases can be realized by a time-division multiplexing access).

The storage unit 201 allows a real-time moving-picture data to pass through a line 213 using the port 201a. Since the service passing through the line 213 is the CBR or the VBR, the quality of service is guaranteed with respect to bitrate and delay. This data is transmitted to a switch 209 via the network terminating set 205. At this time, the network terminating set 205 detects a time stamp, and the detected time stamp is transmitted to a stream control circuit 208. The switch 209 causes one of two inputs to be connected to the access network so as to offer a service to the STU.

On the other hand, in a line 214 using a service whose quality is not guaranteed, the transmitted bit rate, the error rate and so forth are not always guaranteed (a best effort). The storage unit 201 uses this line to transmit the video data in order from the end thereof. The video data transmitted in order from the end thereof is transferred to a storage unit and stored therein as a non-error data obtained, by performing the error correction or the retransfer demand if necessary. At this time, the network terminating set 206 detects the time stamp of the transmitted data, and inputs the value thereof to the stream control circuit 208. Since the data transmitted from the line 214 is transmitted in the retrospective direction from the end, the value of the time stamp should be detected in the decreasing direction.

The stream control circuit 208 always monitors the time stamps transmitted from the network terminating sets 205 and 206. The stream control circuit 208 transmits a control signal so as to always output a stream of an earlier time stamp. That is, the stream control circuit 208 transmits a control signal to control so that the output from the network terminating set 205 is transmitted to the STU via the access network when the time stamp from the network terminating set 205 is smaller than that from the network terminating set 206 and so that the output from the storage unit 207 is transmitted to the STU via the access network in the reversed case. In parallel thereto, simultaneously when the relationship between both time stamps is first reversed, the stream control circuit 208 outputs a control signal to the storage unit 207 to stop storing of data from the network, and demands that the reproduction is performed in order from a small value of the time stamp. At this time, the image data transmitted to the STU through the access network is switched from the transmission via the core network 213 to the transmission via the storage unit 207. After the switching is confirmed, the stream control circuit 208 demands that the network terminating sets 205 and 206 are disconnected from the server. Since the core network is not required to be used for this service after this time, the network resources can be used for another service.

Figure 3:
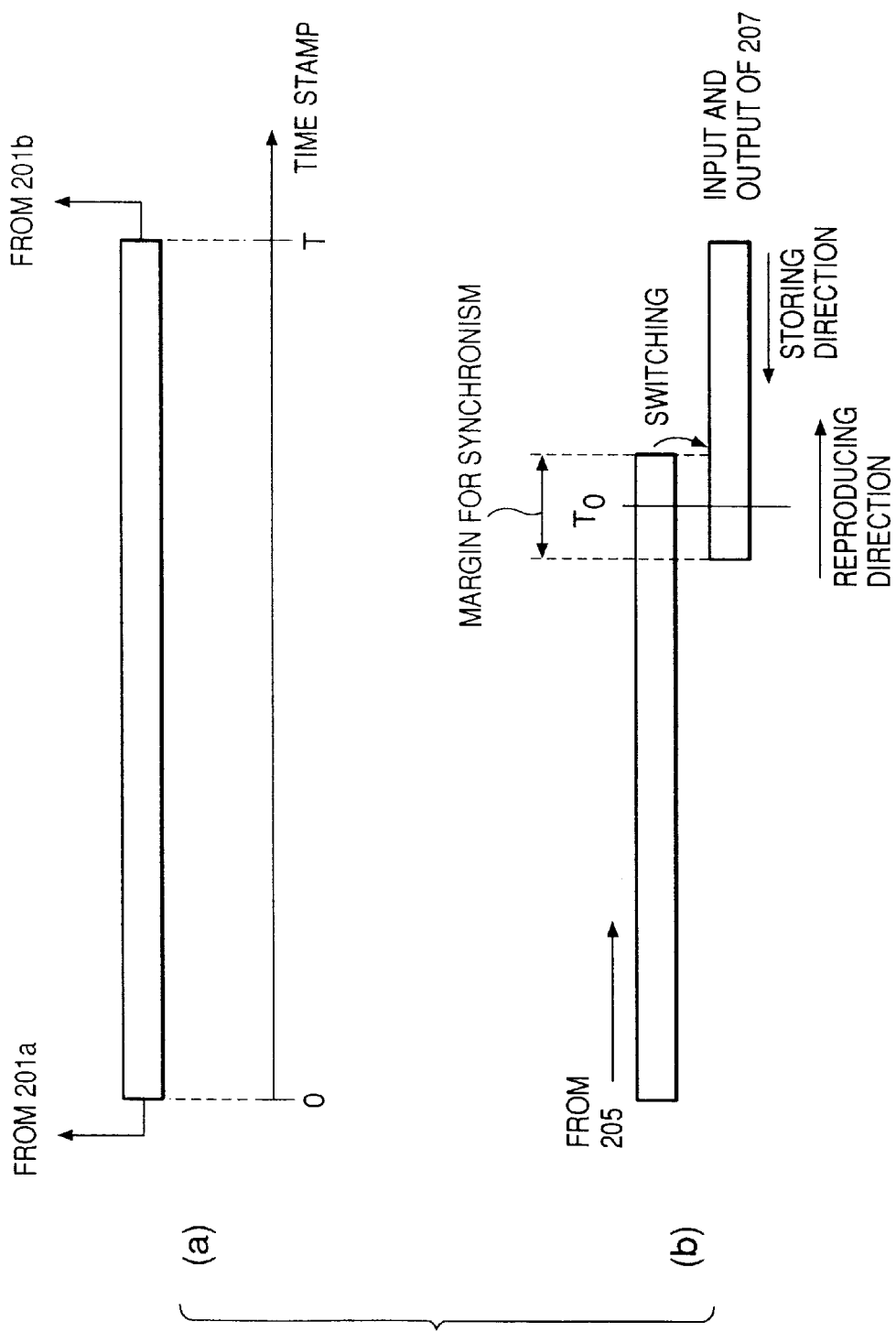
FIGS. 3(a) and 3(b) are views illustrating the relationship between information stream and time.

FIGS. 3(a) and 3(b) illustrate the states of transmission for the whole video source. As shown in FIG. 3(a), a stream having a length of T is outputted from the output port 201a in order from the beginning of the stream, and from the output port 201b in order from the end of the stream. In FIG. 3(b), the same stream is divided into two partial streams; a partial stream from the network terminating set 205 and a partial stream from the storage unit 207. In this figure, the large or small relationship between both time stamp values is reversed when the time stamp value is T0, so that the output from the switch 209 is changed over. However, in this case, there are preferably some margin (the overlapped portion in FIG. 3(b)) so that the switching is not performed just at the time of T0. In this case, both partial streams are reproduced in the same direction for some time after T0. However, if it is controlled so as to change-over the switch at the time when it is confirmed that both are completely synchronized, the switching of stream can be smoothly performed without causing discontinuity due to the switching.

The term "access in order from the end" does not always mean the reverse every bit, but it means that the data are taken out of the end every certain unit. Since the read-out of data is performed in the reverse direction after the data are stored, the arrangement of bits when the data are read out of the storage unit 207 in the reverse direction must be the same as the arrangement of bits when the data are read out thereof in the forward direction. The unit, which can easily realize this, depends upon the type of the storage medium. For example, when a hard disk is used as the storage unit, an unit for access is a track, so that this unit may be taken out of the end to perform the transmission.

While it has been described that the source is transmitted from the output port 201b in order from the end, it is not always required to be transmitted in order from the very end in the case of a long source, but the whole source may be divided into a number of parts to perform the aforementioned transmission with respect to each part. In this case, the switching of the stream, the setting of connection and the disconnection as set forth above are repeated by the number of the division. In the aforementioned preferred embodiment, while the data stored in the storage unit has been transmitted at the same time as the transmission of the data reproduced in real time, it is considered that the data stored therein are not always transmitted at the same time so that they have been previously stored. This is the case that, for example, the storage unit is commonly used by a plurality of clients, and when a client accesses the program watched by a previous client, the data stored for the previous client have been already stored in the storage unit to be reused.

Figure 4:
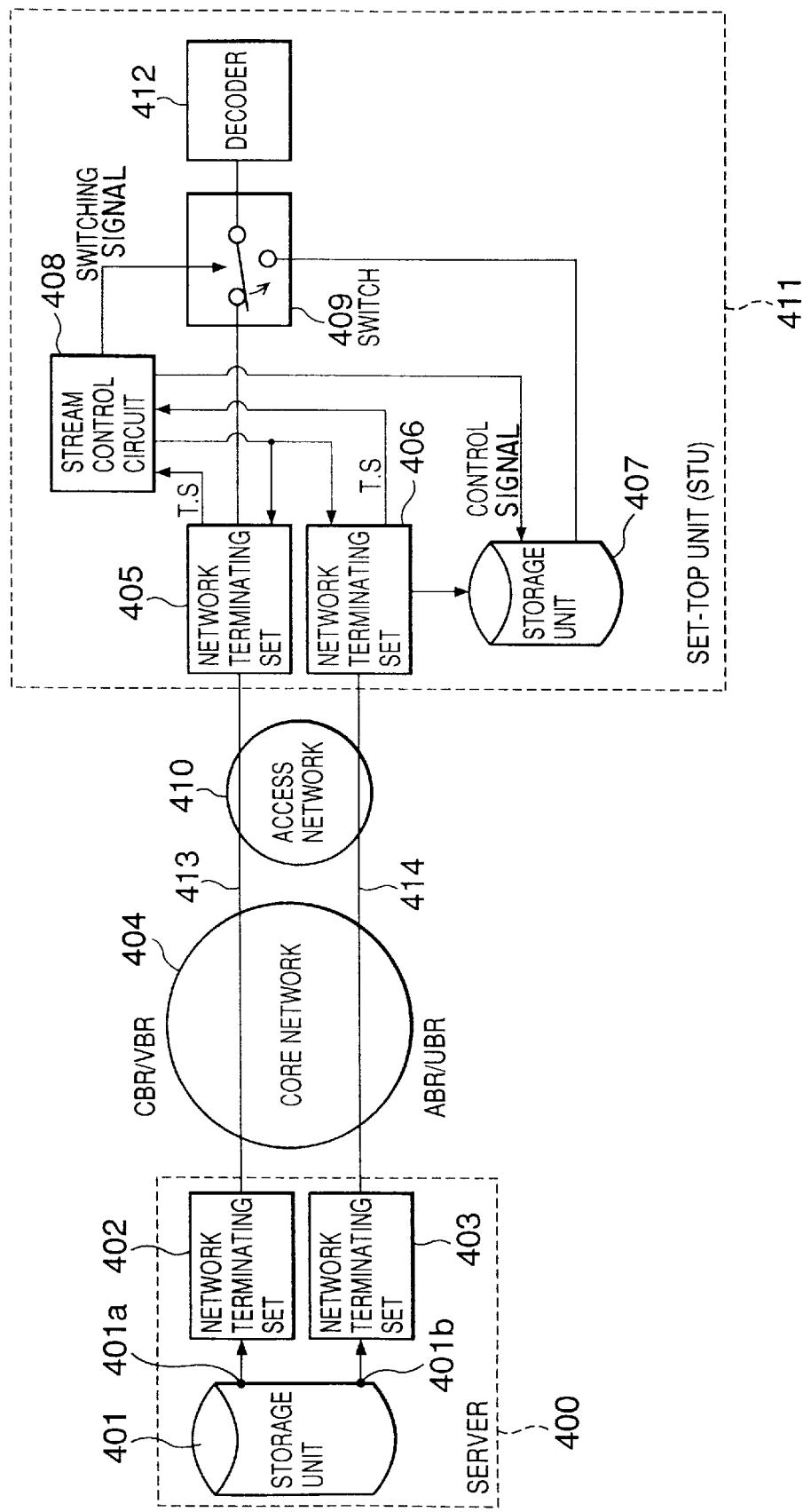
FIG. 4 is a schematic view of a second preferred embodiment of an information transmission system according to the present invention.

In addition, while the storage unit has been arranged in the headend in the aforementioned preferred embodiment, the components 205 through 209 of FIG. 2 may be arranged in the STU as shown in FIG. 4 for practicing the present invention (since the operation of this construction is the same as that of the preferred embodiment of FIG. 2, the description thereof is omitted). In this case, the client using the STU can perform the disconnection for a shorter period of time than that of the video source, so that it is possible to decrease the cost for the offer of a service when the unit price for transmission in the connection of the ABR is lower than that of the CBR.

In FIG. 4 showing the second embodiment, a moving picture transmission system comprises a server 400 for storing moving picture data, a core network 404, an access network 410, and a set-top unit (STU) 411. The server 400 includes a storage unit 401 having ports 401a and 401b, a network terminating set 402 provided between the ports 401a and 401b, a network terminating set 402 provided between the port 401a and a line 413 for VBR and/or VBR, and a network terminating set 403 provided between the port 401b and a line 414 for ABR and/or UBR. The set-top unit (STU) 411 comprises network terminating sets 405 and 406 which are connected with the lines 413 and 414, respectively, a storage unit 407 for storing the moving picture data supplied through the network terminating set 406, a stream control circuit 408 for outputting a switching signal and a control signal, a switch 409 for changing over data from the network terminating set 405 and the storage unit 407 in accordance with a switching signal from the stream control circuit 408, and a decoder 412 for decoding the data which are sequentially supplied by changing over by the switch 409. In the stream control circuit 408, the switching signal causes the switch 409 to output a data stream having a time stamp (T.S) earlier than the other after detecting both time stamps (T.S) of data respectively supplied through lines 413 and 414, and the control signal causes the storage unit 407 to stop a storage of data.

According to the present invention, when a client demands a special reproduction, it is possible to perform operations for a fast forward, a slow reproduction and a pause, similar to the conventional system without any problems. There might be problems in the cases of a reverse reproduction (including fast and slow reproductions) and a random access after the output is switched to the storage unit. As methods for coping with these cases, it is considered that (1) the service-side line of a guaranteed quality is recalled to start a service from a server, and (2) the data reproduced in real time is also stored in the storage unit to cope with the aforementioned cases by the data stored therein.

In a case where a line of a guaranteed communication quality is permanently set to a core network between a server and a headend like an exclusive line, the present invention can also be effectively practiced. For example, consider that a plurality of CBR lines (or VBR lines) are permanently (or semipermanently) set to a core network to be commonly used by a plurality of video data. In the present invention, the video data transferred from a server via a core network are classified into two types; an immediate data directly reproduced in a STU via a headend, and a temporary stored data temporarily stored in a storage unit of a headend. For example, the temporary stored data is transferred in the retrospective direction from the end of the video data. Conventionally, only the immediate data commonly uses a plurality of CBR lines. In this case, in order to obtain a space CBR line at a sufficiently high probability when a demand for transferring the video data occurs, it is required to decrease the used rate of the plurality of CBR lines to some extent, so that the original transfer ability of the CBR line can not fully used.

The present invention may be applied to a method for transferring an earlier portion of the video data to a headend using a space CBR line which has not been used for the temporary stored data. That is, the video data is temporarily stored in a storage unit of the headend. If it is confirmed that the storage unit can reproduce the same data as the video data transferred to the STU as an immediate data, the CBR line used by the immediate data is returned to a space line, and the video data reproduced from the storage unit is transmitted to the STU. In this way, according to the present invention, it is possible to decrease the rate of the CBR line used by the immediate data. In this case, if the degree of priority of the CBR line used by the immediate data is set to be higher than that of the temporary stored data, the aforementioned advantageous effect can be enhanced. When a new demand for transferring a video data occurs, the use of the CBR line used by the temporary stored data is discontinued if there is no space CBR line, and that line is used by the immediate data in place of the temporary stored data. In this case, the quality of the video data reproduced in the STU is not deteriorated (the proportion of the video data transferred by the immediate data is merely lowered temporarily), and the transfer of the temporary stored data may be restarted when a space CBR line is produced again.

According to the present invention, when a plurality of CBR lines can be effectively used and the same CBR line is provided, it is possible to receive a greater number of demands for transferring a video data than that in the conventional systems. In addition, when a system which can receive the demands for transferring the same video data is constructed, there is an advantage in that the number of the required CBR lines is less than those of the conventional systems.

The second aspect of the present invention is also effectively used in a method for decreasing communication costs particularly when the service of storage type data such as VOD is offered in real time. A server system, which has received a demand for the offer of image, begins the offer of information to a receiving apparatus, which has transmitted the demand, in real time in the forward direction from the beginning of an information source such as a movie. As the quality in this case, the real-time characteristic and the low cell-discarding characteristic are required. Therefore, a class of a sufficiently guaranteed quality, such as the CBR, is used. On the other hand, at the same time as the offer of call, an information, which is not required to be offered in real time, is transmitted to the same receiving apparatus, for example, in the retrospective direction from the end of the information source, using a best effort communication class, such as the ABR and the UBR, as a second communication line, which is inexpensive although it is in non real time. The receiving apparatus transfers the real-time information transferred through the CBR, to the downward thereof as it is. On the other hand, the non-real-time information transferred through the best effort is being stored in a storage device, and the call for the high-quality class for real-time is released at the point of time when the non-real-time information reaches the same information as the real-time information. The information after that point of time is not required to be transferred through the CBR since it has been already stored in the storage device.

That is, if it is assumed that one information source is transferred, the portion of information transferred through the second-class communication line is unnecessary as the period of time for requesting to ensure the call of a high-quality class, and the transfer can be carried out at a low communication cost by that portion.

In particular, if the second communication line is the best effort class, the transfer can be extremely effectively carried out. That is, in the 6 Mbps MPEG information communication as set forth above, the transfer in the real-time information communication line must be carried out at a rate of 6 Mbps regardless of the band of the transmission line. However, in the best effort class used for the non-real-time information, the space bands except for the guarantee class are used with no waste to transfer the information. Therefore, if another user does not demand the offer of information, the best effort class can be used for the portion of 149 Mbps (155 Mbps–6 Mbps=149 Mbps). Therefore, it can be transferred using bands 20 times or more as large as those for the real-time information, so that it is the same that most of information is transferred via the best effort class. Of course, when another user demands the offer of information at the same time, such an efficiency can not be achieved. In general, in communication line designs, a band design is performed presupposing the asynchronism of calls such as a large crowd forming effect. Therefore, it is designed so as to have spare bands on the basis of a certain standard. From the standpoint of a band used efficiency, it can be expected that there are actually a great number of space bands for use in the ATM. For example, if the network is designed so that the band used efficiency is 50% at the cell level, the residual 50% can be used in the best effort class. As compared with the cost for transferring information via the CBR, the half thereof can be cheaply transferred at a cost of the best effort class.

Such a multiplex transmission system, which uses a plurality of classes of different quality, is effective particularly in a core network using a large-capacity transmission line which has substantially the same capacity as that of a server system in which user's demands are multiplexed, so that it seems that the multiplex transmission system is not always required for transmission lines of an access network to respective homes. In such a case, if a system for receiving the plurality of classes to store a non-real-time information is provided as an intermediate system such as a headend arranged between the core network and the access network, it is possible to provide a system in which the cost performance of the whole network is good.

In addition, in another preferred embodiment, a movie or the like is transmitted in a forward direction from the beginning thereof using an ABR channel wherein the minimum transmission rate and the low cell discharging characteristic are guaranteed although the real-time characteristic is not always guaranteed. In this case, it is transmitted so that the guaranteed minimum data transmission rate is a reproduction transmission rate sufficient to reproduce a movie or the like in real time. Thus, it is possible to ensure the minimum reproduction transmission rate and to transmit the movie or the like at a higher transmission rate than the minimum reproduction transmission rate if there is room in bands. Real-time data previously transmitted due to the room in bands stays in a FIFO arranged between transmitting means and reproducing means, and is extracted at the time necessary for reproduction. This is realized by causing the output from the FIFO to be coincident with the reproduction transmission rate. In this case, the whole channel used for the transmission is the best effort class, and it is realized at a lower communication cost than that when the whole data is transmitted by the CBR.

While the overall operation of the present invention has been described above, the preferred embodiments of the present invention will be described in detail.

Referring now to the drawings, the preferred embodiments of the present invention will be described below. Furthermore, while all the following descriptions are directed to an image data transfer, the data of the present invention should be not always limited to a moving picture data as long as it is a real-time data (for example, audio data). Furthermore, in general, the time management of the transmission of real-time data is often performed by applying time stamps thereto in a multiplex transmission format represented by the MPEG system standard (ISO/IEC 13818-1). It is assumed that the present invention is also directed to such a case.

FIG. 1 is a schematic view illustrating the construction of a typical VOC system. This system generally comprises a server, a network and a set-top unit (STU: a receiving terminal). The network is further divided into a core network and an access network.

Figure 5:
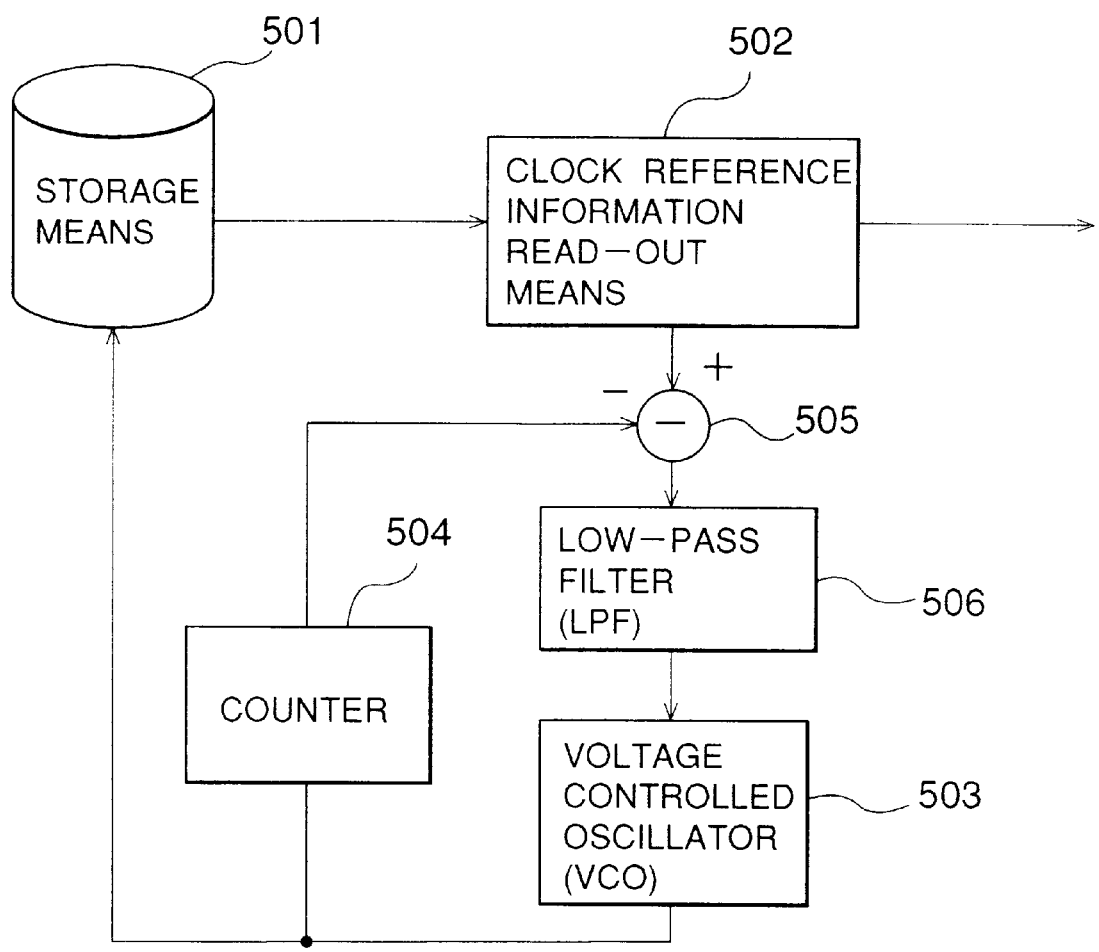
FIG. 5 is a view illustrating the determination of a read-out bit rate from storage means.

Referring to FIG. 5, a read-out rate of the storage means 207 will be described. Although it is assumed herein that the MPEG system is used as an AV multiplex system as mentioned above, a clock reference information is written, using a clock in a coded source, in a bit stream multiplexed by the MPEG system. It is ideal that the read-out of the storage means 207 is performed at a transmission bit rate assumed by the coded source. In order to realize this, a clock in a coded source is generally reproduced at a local as shown in FIG. 5 to perform the read-out on the basis of the clock. In FIG. 5, the reference number 501 denotes storage means serving as a physical medium. The data stored therein is read out to perform a part of interpretation of the MPEG system by clock reference information read-out means 502 to read out a clock reference information. The clock reference information is obtained by sampling a counter value operated by a source clock. This information is transmitted to a counter 504 and a PLL which comprises a VCO (Voltage Controlled Oscillator) 503, a low-pass filter 505 and a subtracter 506. When the operation is started, the clock reference information is set in the counter as an initial value. The counter 504 is a counter which is operated by the clock of the VCO 503. Every time the clock reference information is read out, the subtracter 506 derives a difference between the output of the counter 504 and the clock reference information, and the difference is inputted to the VCO 503 via the low-pass filter 505. By this operation, the difference becomes zero when the VCO is locked at the clock of the coded source to be stabilized. Thus, the clock of the coded source is recovered in the local, and the data is read out of the storage means 501 on the basis of this clock. Furthermore, the read-out of the storage unit 201 on the side of the port 201a basically has the same operation as the aforementioned operation. The read-out data is transmitted via the switch 209 and an interface on the side of an access network (not shown). The transmission clock on the side of the access network is constant even if the switch 209 is changed over, and this clock is independent from the clock of the coded source. In the preferred embodiment of FIG. 4, the same operation may be used. Alternatively, since the storage unit 407 is local and the read-out rage is controllable by the decoder 412, there is particularly no problem in that the clock of the local decoder (which has been synchronized with the clock of the coded source in the aforementioned method before switching) may run by itself after the switch 409 is switched to the storage unit 407.

Figure 6:
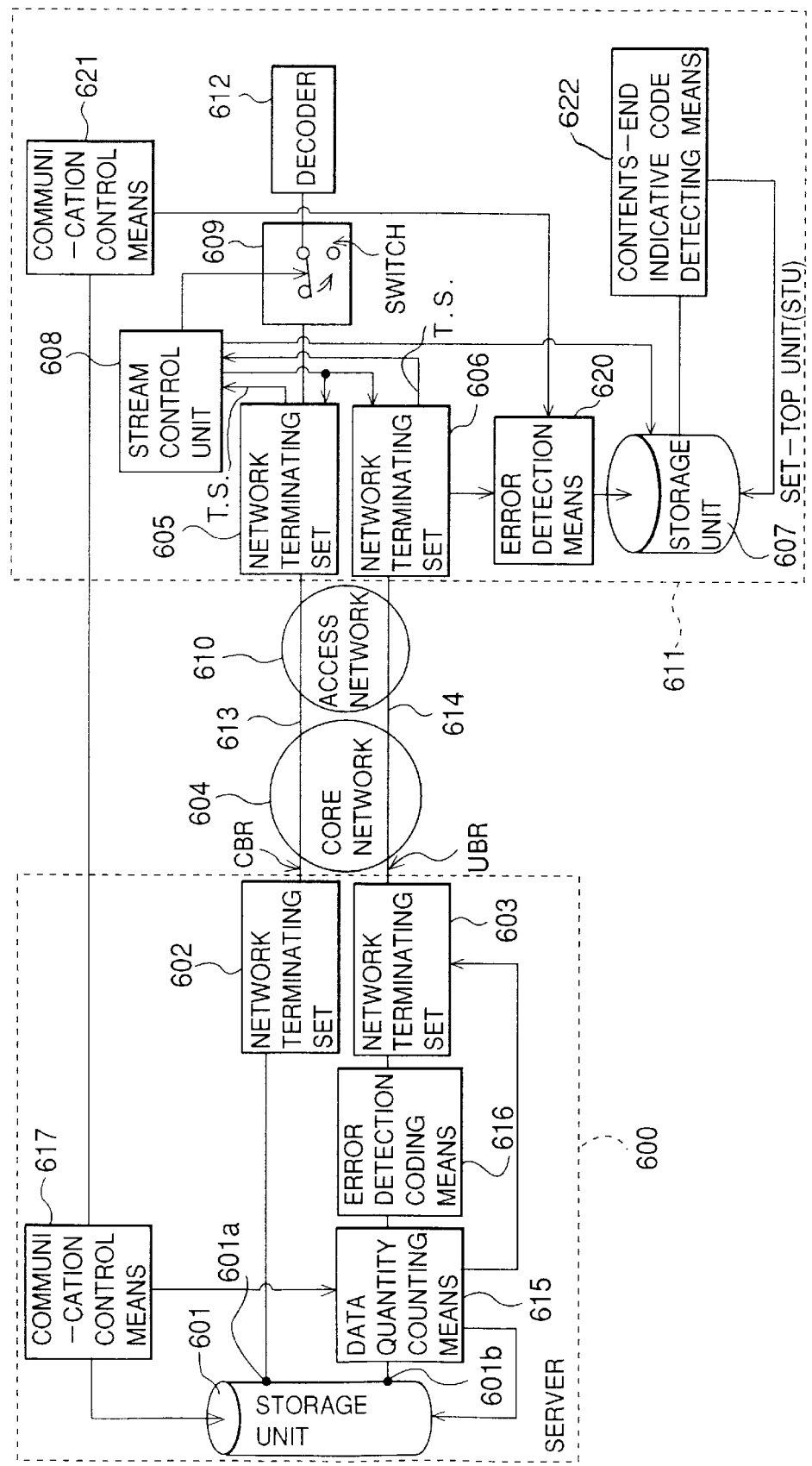
FIG. 6 is a schematic view of another preferred embodiment of the present invention.

Referring to FIG. 6, another preferred embodiment of the present invention, which has an additional function, will be described below. In this preferred embodiment, there is two variations at locations, wherein the storage unit is arranged, similar to FIGS. 2 and 4. However, in order to simplify the explanation, only construction, wherein the same storage unit as that of FIG. 4 is arranged on the side of the STU, will be described below. Since the basic operation is the same as that in the preferred embodiment of FIG. 4, the same portion of the operation will be omitted.

A storage unit 601 has two ports: a port 601a for outputting a video source from the beginning thereof, and a port 601b of the video source from the end thereof. In this preferred embodiment, it is assumed that a network terminating set 602 communicates using a CBR and a network terminating set 603 communicates using a UBR (or independent lines for performing best effort services like an Internet may be used).

When communication is started, STU-side communication control means 618 reports a usable capacity of a storage unit 607 to server-side communication control means 617. The quantity of data actually transmitted through the network terminating set 603 is counted by data-quantity counting means 614. When this value is equal to the reported value, it is determined that the storage means 607 is filled up, so that the data-quantity counting means outputs a control signal to the storage means 601 and the network terminating set 603 so as to stop the preceding data transmission from the output port 603.

Separately from this, when communication is started, the STU side is able to select either of a communication mode wherein only the output portion 601a is used or a communication mode wherein both the output ports 601a and 601b are used. This is because the preceding transmission is either effective or ineffective in accordance with the type of the contents. For example, in the case of the contents which have a long duration and a high possibility viewed from the beginning to the end, such as a movie, the preceding transmission is effective. However, in the case of the contents which are formed by a great number of independent contents every short time, such as the results of sports, particularly sumo (wrestling), the previously transmitted portion may be not viewed to be discarded, so that the preceding transmission may increase the cost. With respect to such contents, when communication is started (when the contents are selected), the selected signals are transmitted between the communication control means 618 and 617 so as to perform only the transmission by the CBR. Alternatively, the correspondence between the contents and the mode may be previously set on the side of the server.

In lines such as UBR or more generally used Internet, it is not possible to ensure errors. Therefore, in lines utilizing such services, it is effective for an error detection code to be added by error detection coding means 615 of the server in order to detect an error by error detection means of the STU to request the retransmission of the transmitted unit, in which the error is detected, via the communication control means. In the preferred embodiments of FIGS. 2 and 4, such operations are not performed in the preferred, so that it is assumed that the error is concealed by the decoder. In some decoders for video, when errors, such as arrangements of bits which are not able to exist at the decoder level, are detected, the errors are concealed by outputting the image of the previous frame or the like. Therefore, if the errors remain existing, the operation does not fail. However, if the errors are corrected by retransmission, the quality is enhanced. The influence of errors upon audio is more remarkable. Although an error correction may be performed in place of the error detection, it is sufficient for detection and retransmission to be performed since the data transmitted via the UBR is not reproduced in real time.

In this preferred embodiment, the storage unit 607 is provided in the STU, so that there is a possibility in that a part of the transmitted real-time data is stored in the storage unit to allow the access of the stored data. This is undesirable with respect to copyright. For that reason, the storage means 607 may have means 609 for detecting a code representative of the end of the contents, so as to automatically erase the stored contents after detecting the code.

Figure 7:
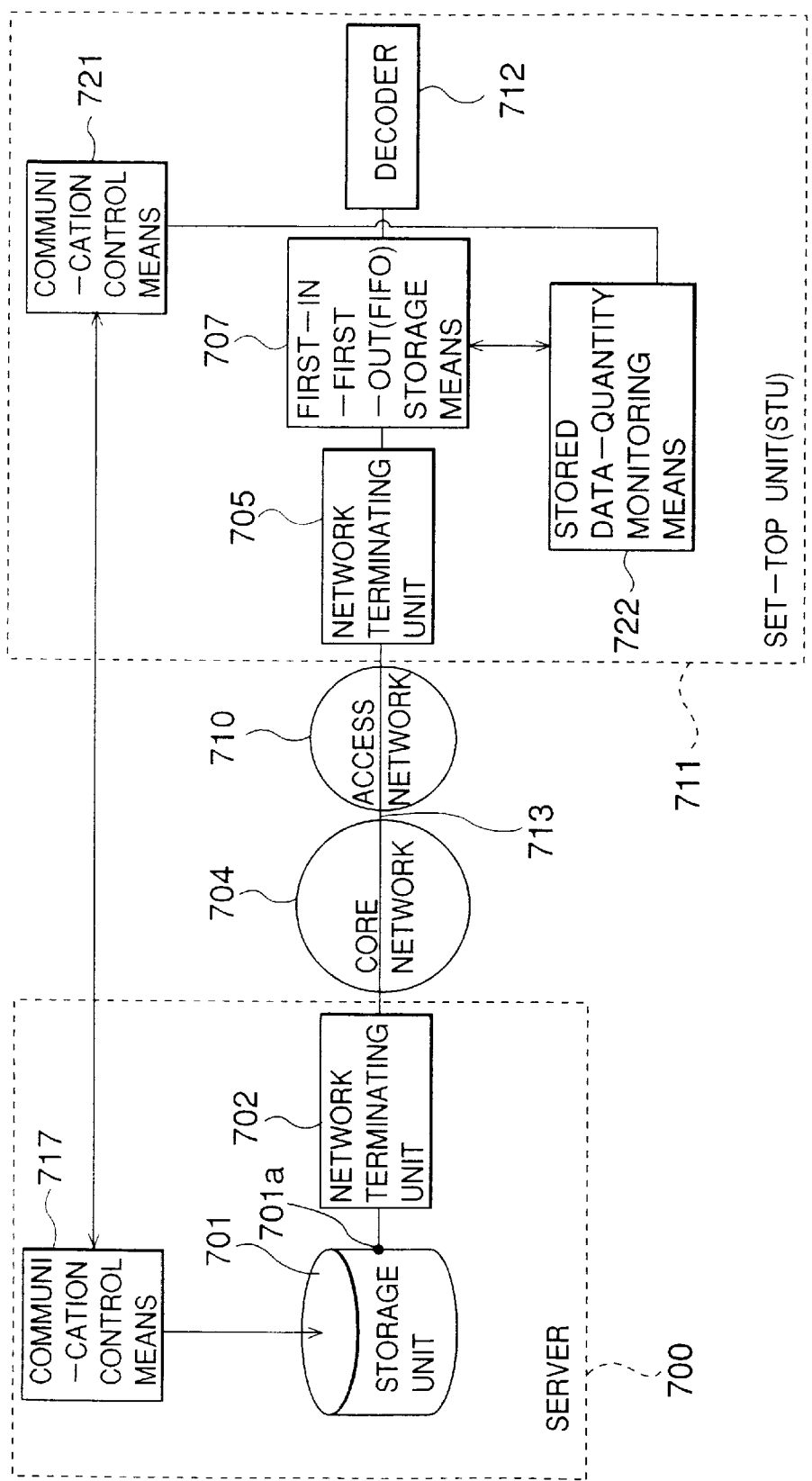
FIG. 7 is a schematic view of further preferred embodiment of the present invention.

Referring to FIG. 7, another preferred embodiment of the present invention will be described below. In this preferred embodiment, there is two variations at locations, wherein the storage unit is arranged, similar to FIGS. 2 and 4. However, in order to simplify the explanation, only construction, wherein the same storage unit as that of FIG. 4 is arranged on the side of the STU, will be described below. The description of the same operation as that in the preferred embodiment of FIG. 4 will be omitted.

Figure 8:
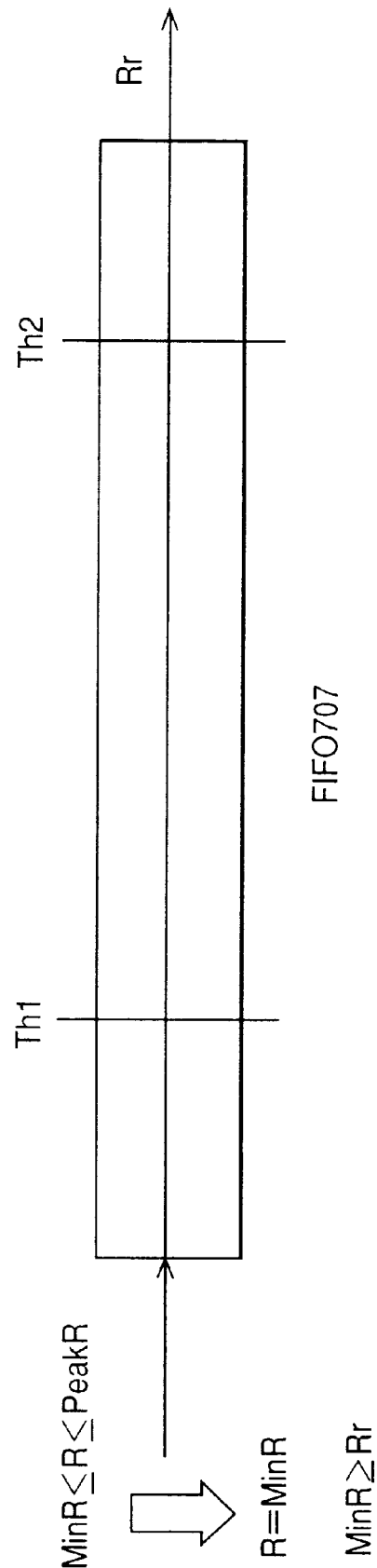
FIG. 8 is a view illustrating the storage capacity and control in the preferred embodiment of FIG. 7.

In this preferred embodiment, a real-time data is transmitted via a single line 713, which offers the ABR service class. In the ABR, parameters such as a guaranteed minimum transmission rate (which will be hereinafter referred to as "MinR") and a peak rate (which will be hereinafter referred to as "PeakR") are reported to establish communication. That is, if there is room in bands after ensuring at least the bands of the MinR, the transmission rate up to the PeakR is able to be obtained. Therefore, it is assumed that the transmission rate for reproducing a transmitted real-time data in real time is Rr. If the report and transmission are performed so that $Rr \leq$ MinR, the arrival of data at the receiving side is not delayed from the required time. In this method, the real-time data is transmitted to the input port of a FIFO 707. The read-out rate at the output of the FIFO 707 is determined by the principle described in FIG. 5, and it is read out at a rate of Rr to be inputted to a decoder 712 to be reproduced in real time. In the FIFO 707, integrated values of actual transmission rates Rr are stored. When the transmission of all the data from the transmitting side is finally completed, this data of the integrated values corresponds to the portion which has been able to be transmitted by the room for bands in the network, so that it is possible to naturally transmit that portion at a lower cost than that of the transmission via the CBR. The quantity of data stored in the FIFO 707 is monitored by stored-data quantity monitoring means 719. On the basis of this quantity of stored data, the scope of transmission rate exceeding the MinR on the transmitting side is controlled by a control signal by means of communication control means 718 and 717, in order to prevent the FIFO 707 from overflowing when the capacity of the FIFO 707 is less than the capacity (=T(1−MinR/PeakR), T: quantity of all data) for storing all the maximum values of the finitely transmitted real-time data. The most simple method is a method for controlling the transmission rate on the transmitting side so as to be the MinR after the FIFO 707 becomes a certain value Th1. This state is shown in FIG. 8. The Th1 is derived from the following formulae:

$$F=N/MinR*(MinR-Rr)+Th1$$

$$N=T-Rr*t-Th1$$

wherein F: Capacity of FIFO, t: Reproduction Time up to the Present, and N: Quantity of Data remaining at Transmitting Side.

In addition, since the ABR does not always guarantee the delay, it is effective for the probability of underflow of the FIFO to be within the tolerance by deriving the quantity D of allowable delay by forming a delay model and so forth, and by starting the operation of the portions after the FIFO 707 after data is stored in the FIFO 707 by Th2=D*Rr.

In addition, with respect to overflow, if it will be possible in future to change the band by signaling while connecting the call although it has not been supported up to the present, it is effective for such function to be utilized.

Referring now to the drawings, the preferred embodiment of the present invention will be described below. Furthermore, while all the following descriptions are directed to an image data transfer, the data of the present invention should be not always limited to a moving picture data as long as it is a real-time data (for example, audio data).

In particular, the present invention is directed to a system for data such as managed in time series. Specifically, the invention is directed to a system for data having characteristic wherein the use of the data is managed by a time information such as a time stamp. Throughout this specification, these data will be referred to as real-time data.

Furthermore, in general, the time management of the transmission of real-time data is often performed by applying time stamps thereto in a multiplex transmission format represented by the MPEG system standard. It is assumed that the present invention is also directed to such a case.

Furthermore, throughout this specification, video servers include a temporary memory type server, called a cache node or a network cache, in which a video is stored on or near a communication line set for transmitting the video information which is being offered to an user, and the same video is reused on another user's demand.

Figure 9:
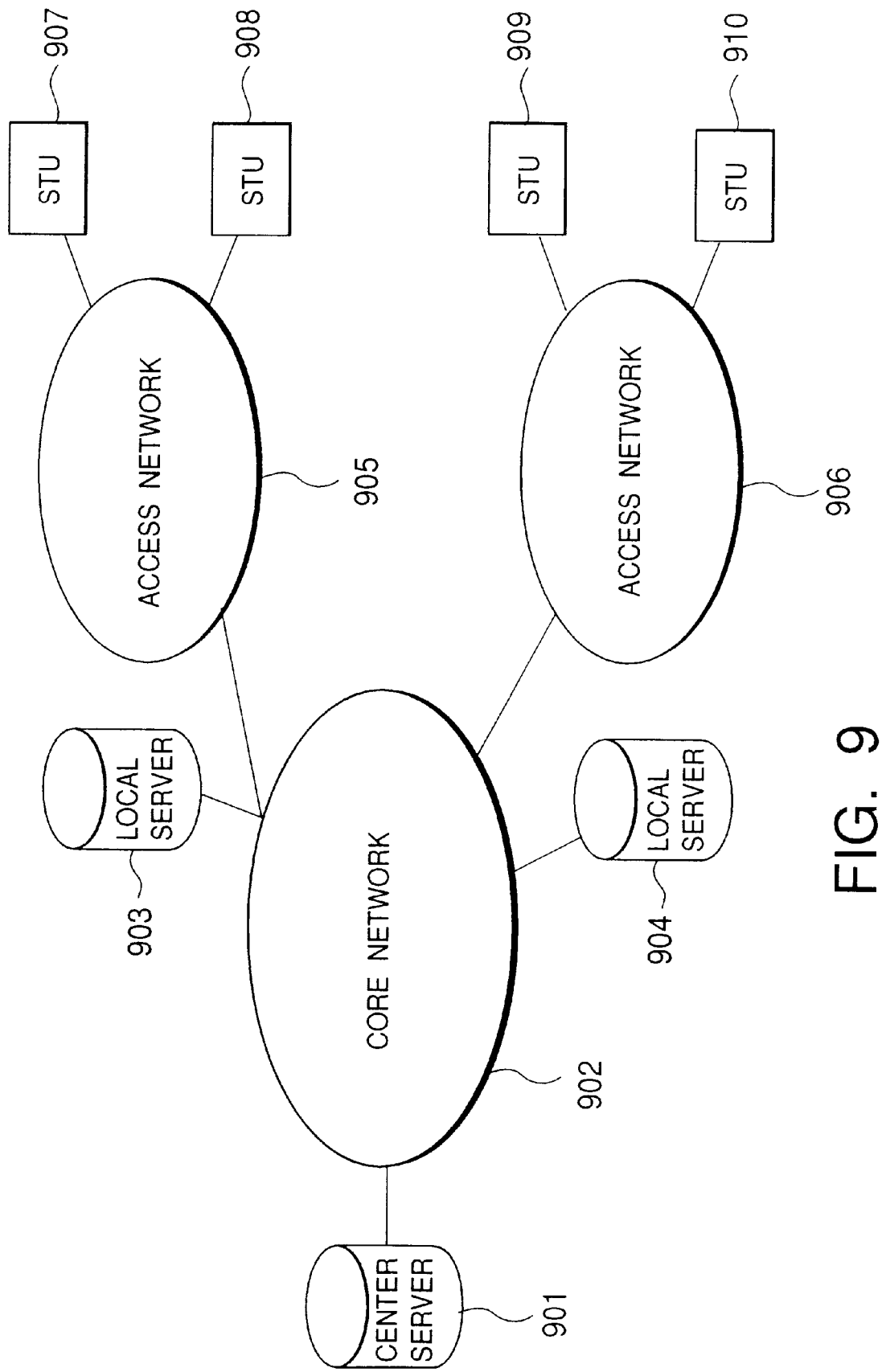
FIG. 9 is a schematic view illustrating a typical VOD system.

FIG. 9 is a schematic view illustrating the construction of a typical VOC system. This system generally comprises a server, a network and a set-top unit(STU: a receiving terminal). The server is further divided into a center server and local servers, and the network is further divided into a core network and access networks. The access network is, for example, a network provided for each area in which a certain number of members live, and the core network is a wide-area network for mutually connecting a plurality of access networks. In general, the local server stores video sources, which are expected that the frequency in access is high, and are arranged in each area wherein the users live. On the other hand, the center server stores video sources, which are expected that the frequency in access is low, and is arranged at a center remote from the users to be accessed via a high-speed, wide-area core network. For example, in a CATV system called HFC (Hybrid Fiber Coax), the access network comprises a CATV network formed by coaxial cables connected to the STU in the form of a tree. The local server is arranged for each area which contains at least one headend (HE) provided at the connecting point, at which the core network formed by optical fiber network is connected to the access network, and the center server is arranged at a location relatively remote from the optical fiber network.

Figure 10:
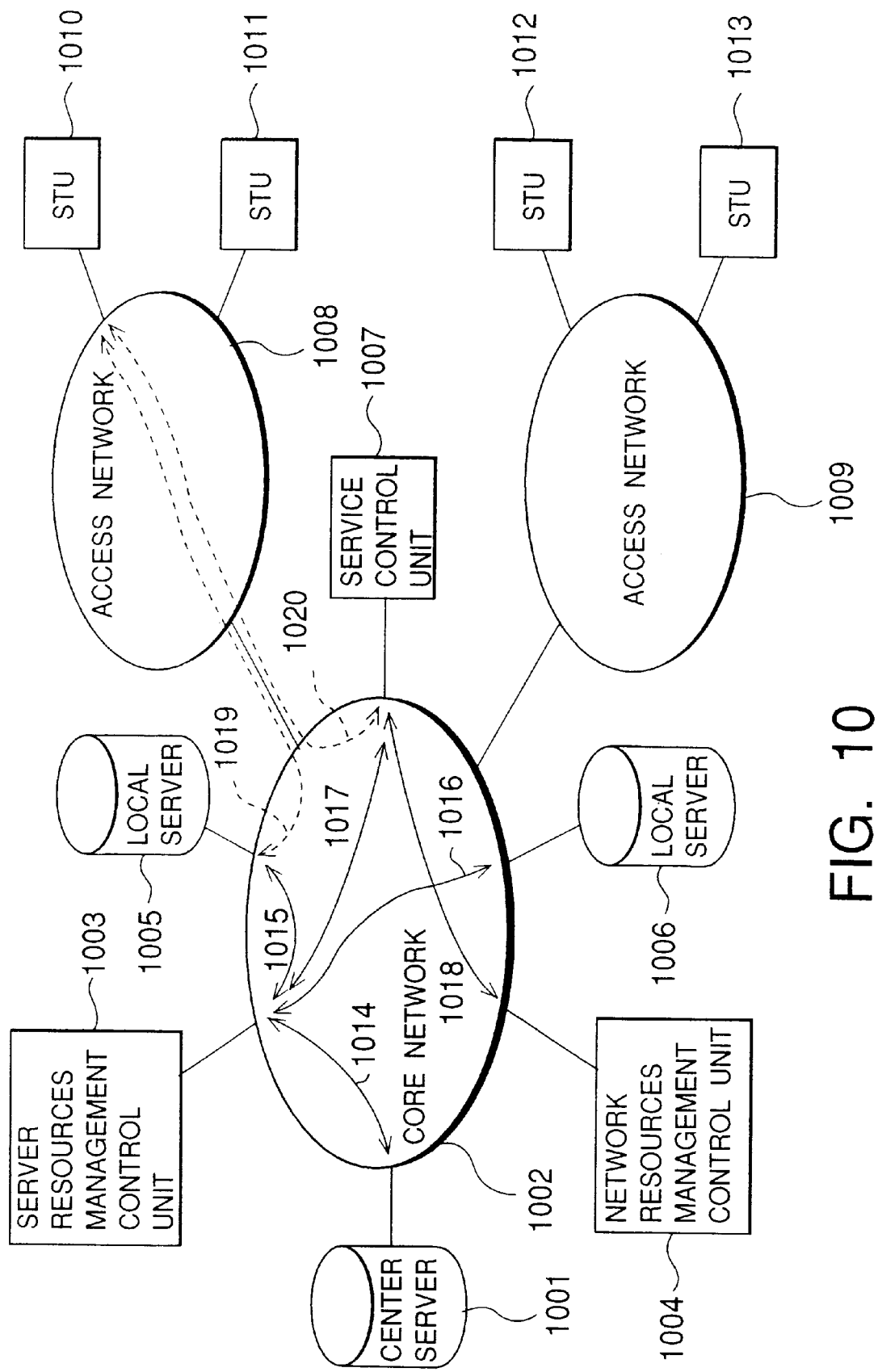
FIG. 10 is a schematic view illustrating the preferred embodiment of the present invention.

FIG. 10 is a schematic view illustrating the preferred embodiment of a VOD system according to the present invention. The reference number 1001 denotes a center server which stores therein video sources having a relatively low frequency in access, and the reference numbers 1005 and 1006 denote local servers which store therein video sources having a relatively high frequency in access. A core network 1002 informs a server resources management control unit 1003 of the conditions of resources for the respective servers, via channels 1014, 1015 and 1016. On the basis of the directions by the server resources management control unit 1003, a video is transmitted, via channels 1019, to STUs, to which the user's terminals are connected. The conditions of resources for the respective servers include the kind of video sources stored in the respective servers, the number of simultaneous accesses to the respective video sources, the number of users during services for the respective servers and so forth. Since there are upper limits with respect to the number of simultaneous accesses to the same video source and the number of users to which services are able to be offered at the same time for each server, a new demand for service is not able to be accepted when they have already reached the upper limits. The server resources management control unit 1003 informs a service control unit 1007 of the conditions of server resources via a channel 1017. The channels 1019 are set by a network resources management control unit 1004. The network resources management control unit 1004 manages and controls the network resources, such as the bands of transmission lines contained in the core network 1002, and the buffer capacities of exchange nodes. Since there are upper limits in the bands of transmission lines and the buffer capacities of exchange nodes, a new channel is not able to be established when they have already reached the upper limits. The network resources management control unit 1004 informs the service control unit 1007 of the conditions of network resources via a channel 1018.

A user 1010, who attempts to newly utilize a VOD service, makes a request to the network management control unit 1004 using signaling means, so as to establish a channel 1020 between the user and the service control unit 1007, and a request to the service control unit 1007 for the commencement of a new VOC service. The service control unit 1007 determines whether channels for transmitting a video are able to be established between the users 1010 and the local servers 1005, 1006 and the center server 1001, and makes a reservation for bands between the user and a server, which can be established, to the network management control unit 1007 via the channel 1018. In this case, as the bands required to transmit a video, when only video sources coded at a constant bit rate are stored in the server, a band corresponding to the bit rate are ensured, and when video sources coded at different bit rates are mixed to be stored in the server, the highest band, which is higher than the band corresponding to the lowest rate and which is lower than the band corresponding to the highest rate, is ensured. When video sources of different bit rates are mixed and when the band up to the band corresponding to the highest rate has been able to be ensured, it is impossible to offer the video resources of bit rates exceeding the band which has been able to be ensured. The service control unit 1007 selects a video source, which is able to be offered immediately if a user requests, among the conditions of resources in the server in which the reservation for bands is made, and makes a reservation for server resources to the server resources management control unit 1003 via the channel 1017.

The service control unit 1007 discriminates that the video source, which has been able to ensure both the network resources and the server resources, is able to be offered immediately, that the video source, which has not been able to ensure at least one of the network resources and the server resources, is impossible to be offered, and that the video source during the processing of the reservation for resources is not able to be guaranteed as to whether it is able to be offered immediately. On these discriminations, the service control unit 1007 informs the user 1010 of a video source to be selected, via the channel 1020. In this case, information methods may include a list of video titles by characters, graphic display and icon display showing the contents of video, and the combination thereof, and does not depend upon the form thereof. The user 1010 selects a desired video source among the proposed video sources informed from the service control unit 1007, and inform the service control unit 1007 of the selected video sources via the channel 1020. The service control unit 1007 determines a server (for example, the local server 1005), to which the video source selected by the user is to be offered, and direct the network resources management control unit 1024 via the channel 1018 to establish the channel 1019 for the transmission of the video between the local server 1005 and the user 1010. When the network resource management control unit 1004 informs via the channel 1018 that the establishment of the channel 1019 is completed, the service control unit 1007 directs the server resources management control unit 1003 via the channel to start to transmit the video to the user 1010 via the channel 1019 of the local server 1005. The server resources management control unit 1003 direct the local server 1005 to start to transmit the video to the user 1010 via the channel 1019, so that the local server 1005 starts to transmit the video. Special playbacks, such as back turn, quick feed and pause, during the transmission of the video are directly performed between the user 1010 and the local server 1006 via the channel 1019 to be controlled.

As mentioned above, in a case where the service control unit 1007 informs the user 1010, via the channel 1020, of the video sources, which have been able to reserve both the network resources and the server resources, as the proposed video sources which are able to be offered immediately, even if the user selects any one of the proposed video sources, the selected video source is able to be offered immediately. Therefore, the user is never rejected, so that the user is able to surely have the service.

On the other hand, in a case where the service control unit 1007 informs the user 1010 of the video sources during the processing of the reservation for resources, as conditional proposed video sources which are not guaranteed to be able to be offered immediately, if the user selects one of the conditional proposed video sources, it is not possible to ensure the resources, so that the user may be rejected. However, there is an advantage in that the number of choices for the user is increased, and even if the user is rejected, the user tends to accept the rejection since the user is able to previously know the risk of the rejection for the service.

In addition, in a case where the service control unit 1007 informs the user 1010 of video sources which are not able to presently offered, as the proposed video sources, the user can recognize that the service menu contains video sources that the user wishes to view, so that there is an advantage in that the user can obtain a standard of judgment whether waiting for some time.

Moreover, in a case where the service source 1007 ensures only the resources required to offer the video source among the reserved resources and releases unnecessary resources, the unnecessary bands are able to be reused for services in the actual transmission of video, so that it is possible to effectively use the network resources. In this case, when a part of the video source selected by the user or a promotion video consisting of highlight scenes of the video source are previewed, although the establishment of channel is performed using the network resources reserving for the channel, until the user decides to view the video source, the residual network resources are not released. After the user decides to view the video source that the user has previewed, for example, after the user operates to agree to the starting of payment, the network resources are released. If the user does not like the previewed video resource, although the established channel is released, the reservation of the band is returned.

In addition, in a case where the user selects a video source which is not guaranteed to be able to offered immediately, the service control unit 1007 ensures video resources required to offer the required video source and the network resources, and releases the residual unnecessary resources. When the service control unit 1007 have not be able to ensure these resources, the service control unit 1007 informs the user of the rejection for the offering of the video source, so that it is possible to increase the choices for the user at the user's own risk.

On the other hand, it is possible to effectively use the resources by reserving, by means of the service control unit 1007, resources for members, the number of which is less than the number of the accessing users, such that the probability of lack of resources is less than a certain value. Since a single user finally selects a single video source, the residual resources are not finally used. Now, the case that 104 users access at the same time will be considered. Since it is considered that video sources having a high frequency in access are arranged in the local server, assuming that the probability that the respective users select the video sources in the local server is 80%, the probability that all of the 104 users select the video sources is 8.3×10–11. Therefore, for example, even if only resources for 103 users are reserved, the probability of lack of resources is less than 10-10. Similarly, assuming that the probability that the users select the video sources in the center server which stores video sources having a low frequency in access is 20%, if resources for 14 users are ensured with respect to 15 users, the probability of lack of resources can be less than 10-10. This is a phenomenon called a large crowd forming effect. When many people select at random, the probability of lack of resources can be less than a certain value only by reserving resources for persons, the number of which is less than the number of the people, so that it is possible to effectively use the resources. In particular, when the resources are ensured in the center server having a low frequency in access, it is expected to greatly improve the efficiency.

Then, in a case where the service control unit 1007 informs, via the channel 1020, the user 1010 of video sources, which are reserved so that the probability of lack of resources is less than a certain value with respect to both the network resources and the server resources, as the proposed video sources which are able to be offered immediately, if the user selects any one of the proposed video sources, the probability that the selected video source is impossible to be offered immediately is less than a certain value. Therefore, the possibility that the user is rejected after the user selects is low, so that it is possible to surely have the service.

On the other hand, in a case where the service control unit 1007 informs the user 1010 of video sources during the processing of reservation for resources, as conditional proposed video sources which are not guaranteed to be able to be offered, if the user selects one of the conditional proposed video sources, it is not possible to ensure the resources, so that the user may be rejected. However, there is an advantage in that the number of choices for the user is increased, and even if the user is rejected, the user tends to accept the rejection since the user is able to previously know the risk of the rejection for the service.

In addition, in a case where the service control unit 1007 informs the user of video sources which are not able to be currently offered, as the selective video sources which are not able to be selected, the user can recognize that the service menu contains video sources that the user wishes to view, so that there is an advantage in that the user can obtain a standard of judgment whether the user is waiting for some time.

While the preferred embodiments of the present invention have been described, the present invention should be limited to these preferred embodiment. For example, while the server has been the two-hierarchy configuration comprising the center server and the local servers in the preferred embodiment as set forth above, it may be a multi-hierarchy configuration. In addition, while the center server, the local servers, the server resources management control unit, the network resource management control unit, the service control unit and the headend have been separately housed in the core network in the preferred embodiments as set forth above, the combination of at least two of these units may be connected to the core network as a physically single unit so that communication can be established between the combined units without any channels. Moreover, while the bands required to transmit the video have been the same regardless of the video sources in the preferred embodiments as set forth above, the bands required to transmit the respective video source may be different.

Since the storage capacity of the video data storage unit is limited, when the storage capacity is saturated, it is required to erase old video data in order to store new video data. In this case, the respective video data is divided into a plurality of segments to be managed, the erasing order of the respective segments is determined on the basis of an elapsed period of time from the final access time of the video data and of a required reproduction period of time from the head of the video data, and a segment suitable for the transmission via the best effort class is preferentially erased. Thus, when the same video source is accessed again, it is possible to decrease the necessity of the transmission via the CBR to more effectively the communication resources. In this case, the method for determining the erasing order to give the segment suitable for the transmission via the best effort class preference is, for example, as follows.

Figure 11:
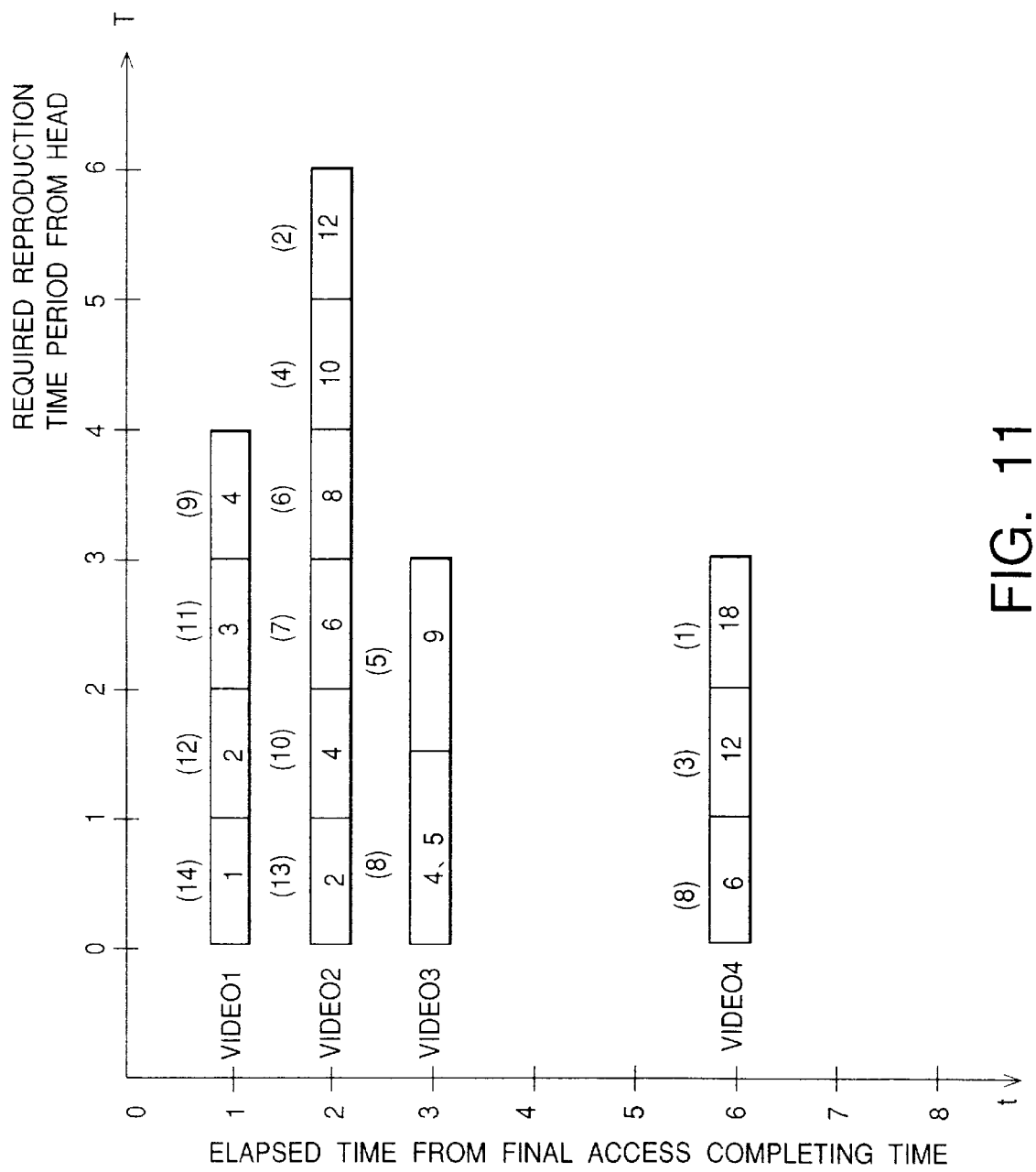
FIG. 11 is a view illustrating a method for determining the erasing order in data storage means in the preferred embodiment of the present invention.

Now, it is assumed that an elapsed period of time from the final access completing time of a video source i is ti and a required reproduction period of time from the head of the video source i to the end of a segment of number j is Tij. In this case, the degree of priority Pij of the segment j of the video source i is derived from Pij=ti×Tij, and the video data is erased in order of the degree of priority. FIG. 11 shows this state. In this figure, the axis of ordinates denotes an elapsed period of time from the final access completing time, and the axis of abscissas denotes a required period of time from the head of a video source to the end of a segment. This figure shows the case that four video sources are stored. Each of the video sources is divided into a plurality of segments, and the length thereof is not always equal to that of another. Although the lengths of the segments illustrated in this figure are equal to each other, they are not always required to be the same. The numbers expressed in the respective segments denote the values of Pij, and the numbers expressed in parentheses above the respective segments denote the erasing orders. That is, it can be seen that as a segment has a long elapsed period of time from the final access completing time, and as a segment is remote from the head of the respective video sources, the segment is preferentially erased. In this figure, when there are segments having the same values of Pij, one of these segments, which has a long required reproduction period of time from the head, is preferentially erased. However, this is merely an example, and a segment having a long elapsed period of time from the final access completing time may be preferentially erased. As mentioned above, since the erasing orders of the respective segments are determined, even if a video source which has started to be erased is accessed again, the retransmission of the erased segment may be performed via only the best effort class without using the CBR line, so that it is possible to reduce the communication cost.

It is required to calculate the degree of priority Pij of the segment j of the video source i every time the erase is required, and such calculation takes time to some extent. Therefore, it is desired that the Pij is calculated when the storage capacity is less than a certain value to erase the segment to always ensure space capacities greater than a certain value.

What is claimed is:

1. A real-time data transmission system comprising:

first communication means having a guaranteed quality required to transmit real-time data;

second communication means different from said first communication means;

means for transmitting stored real-time data using said first communication means and for transmitting real-time data using said second communication means, said real-time data being earlier than said real-time data transmitted by said first communication means;

storage means for storing said data transmitted by at least said second communication means; and switching means for monitoring a period of time for reproducing said real-time data transmitted from said first communication means and a period of time for reproducing said real-time data stored in said storage means, and for switching the output of said real-time data transmitted from said first communication means, to the output of said real-time data transmitted from said storage means when said period of time for reproducing said real-time data stored in said storage means and transmitted from said second communication means elapses, wherein said data transmitted by said second communication means is transmitted in a retrospective direction of said real-time data.

2. An information relay system comprising:

a first input section for inputting an information in a forward direction, said information including a plurality of information parts managed in time series;

a second input section for receiving said information including said plurality of information parts managed in time series, in a reverse direction;

a storage section for storing said information parts inputted from said second input section, in the order that the information parts have been inputted thereto; and a comparing section for comparing said information parts inputted from said first input section, with said information parts stored in said storage section, wherein on the basis of the compared results of said comparing section, the outputs of said information parts from said first input section are stopped, and said information parts stored in said storage section are outputted.

3. An information transmission system comprising:

a first communication element having a guaranteed quality required to transmit real-time data starting with a beginning time stamp and ending with an ending time stamp;

a second communication element different from said first communication unit;

a transmitting unit for transmitting said real-time data using said first communication element in accordance with increasing time stamps of said real-time data starting with said beginning time stamp, and for transmitting said real-time data using said second communication element in accordance with decreasing time stamps of said real-time data starting with said ending time stamp;

a storage unit for storing said real-time data transmitted by at least said second communication element; and a switching unit connected to said transmitting unit and said storage unit, said switching unit for monitoring said time stamps of said real-time data transmitted from said first communication element and said time stamps of said real-time data stored in said storage means, and for switching the output of said real-time data transmitted from said first communication element, to the output of said real-time data transmitted from said storage unit at the time stamp at which said real-time data stored in said storage unit and transmitted from said second communication element is next in time with respect to the time stamp of said real-time data of said first communication element just previously output.

4. An information transmission system as set forth in claim 3, wherein said real-time data transmitted by said second communication element is transmitted in a retrospective direction with respect to said real-time data transmitted by said first communication element.

5. An information transmission system as set forth in claim 3, wherein said transmitting unit prevents said first communication element from retransmitting said real-time data that was already transmitted by said second communication element and then stored in said storage unit.

6. A real-time data transmitting system according to claim 3, further comprising a reproduction unit for receiving the output from said switching unit in order to reproduce said real-time data.

7. A real-time data transmitting system as set forth in claim 6, wherein said storage unit comprises a detecting unit for detecting an error in said real-time data transmitted using said second communication element, and a requesting unit for requesting the retransmission of data in which said error is detected.

8. A real-time data transmitting system as set forth in claim 6, wherein said storage unit reports a memory capacity usable at the time at which communication begins, to said transmitting unit, and wherein said transmitting unit stops transmitting said real-time data using said second communication element when the reported memory capacity of said storage unit is exceeded.

9. A real-time data transmitting system as set forth in claim 6, wherein after the real-time data stored in said storage means is reproduced, the remaining real-time data in said storage means is erased.

10. A real-time data transmitting system as set forth in claim 6, wherein either one of said transmitting unit or said reproduction unit is capable of switching the transmission between the transmission of said real-time data using both of said first and second communication elements and the transmission of said real-time data using only said first communication element.

* * * * *